US012518712B2

(12) United States Patent
Zhang et al.

(10) Patent No.: US 12,518,712 B2
(45) Date of Patent: Jan. 6, 2026

(54) DISPLAY DEVICE FOR CONTROLLING A PLURALITY OF BACKLIGHT ZONES BASED ON DISPLAY ZONES

(71) Applicant: Beijing Zitiao Network Technology Co., Ltd., Beijing (CN)

(72) Inventors: Jihe Zhang, Beijing (CN); Quansheng Liu, Beijing (CN)

(73) Assignee: Beijing Zitiao Network Technology Co., Ltd., Beijing (CN)

( * ) Notice: Subject to any disclaimer, the term of this patent is extended or adjusted under 35 U.S.C. 154(b) by 0 days.

(21) Appl. No.: 18/680,389

(22) Filed: May 31, 2024

(65) Prior Publication Data

US 2024/0404481 A1 Dec. 5, 2024

(30) Foreign Application Priority Data

May 31, 2023 (CN) ........................ 202310632440.8

(51) Int. Cl.
*G09G 3/34* (2006.01)
*G09G 3/36* (2006.01)

(52) U.S. Cl.
CPC .......... *G09G 3/342* (2013.01); *G09G 3/3611* (2013.01); *G09G 2310/024* (2013.01)

(58) Field of Classification Search
CPC .................................................... G09G 3/342
USPC ........................................................ 345/102
See application file for complete search history.

(56) References Cited

U.S. PATENT DOCUMENTS

| | | | | |
|---|---|---|---|---|
| 10,540,930 | B1 * | 1/2020 | Kim | G09G 3/3674 |
| 2005/0259064 | A1 * | 11/2005 | Sugino | G09G 3/342<br>345/102 |
| 2012/0274667 | A1 * | 11/2012 | Kuwayama | G09G 5/10<br>345/87 |

* cited by examiner

*Primary Examiner* — Long D Pham

(57) ABSTRACT

A control method for a display device including a display panel and a backlight device is provided. The display panel includes multiple display zones. The backlight device includes multiple backlight zones. The backlight zones are sequentially illuminated. The illumination time when the first backlight zone is illuminated satisfies followings: $t_1 \geq (m/n+a) \times t_2 + t_3$, $t_1$ is the time from the start of displaying each frame of an image to the illumination of the first backlight zone, m is the number of pixel rows, n is the number of the backlight zones, a is the number of pixel rows occupied by a portion of a light-emitting area that extends beyond the corresponding backlight zone when the backlight zone is illuminated, $t_2$ is the scanning time for each pixel row of the display panel, and $t_3$ is response time when the pixel row receives a row scanning signal.

20 Claims, 8 Drawing Sheets

DISPLAY DEVICE FOR CONTROLLING A PLURALITY OF BACKLIGHT ZONES BASED ON DISPLAY ZONES

CROSS-REFERENCE TO RELATED APPLICATION(S)

This application claims priority to Chinese Application No. 202310632440.8 filed May 31, 2023, the disclosure of which is incorporated herein by reference in its entity.

FIELD

This application relates to the technical field of display, and specifically relates to a control method for a display device.

BACKGROUND

It takes a certain time (liquid crystal response time) for a rotation of liquid crystals in a liquid crystal display device to transit from one display gray scale to another display gray scale. If a backlight is already on during a transition period of gray scale changes, the human eyes may observe two images: a transitional gray scale half-rotated and a gray scale finally rotated, leading to a phenomenon of motion blur. This present disclosure aims to provide a control method for a display device to solve the above problems.

SUMMARY

The present disclosure aims to at least solve one of technical problems in the related art to some extent.

In one aspect of the present disclosure, a control method for a display device is provided. The display device includes a display panel and a backlight device. The display panel includes a plurality of display zones. Each display zone includes a plurality of pixel rows. The backlight device includes a plurality of backlight zones that emit light independently, and are in one-to-one correspondence with the display zones. The display panel is driven in a row-by-row scanning manner, and the plurality of backlight zones are sequentially illuminated in a process of row scanning of each frame of the display panel. The illumination time when the first backlight zone is illuminated satisfies the following condition: $t_1 \geq (m/n+a) \times t_2 + t_3$, where $t_1$ is the time from the start of displaying each frame of image to the illumination of the first backlight zone, m is the number of the pixel rows, n is the number of the backlight zones, a is the number of the pixel rows occupied by a portion of a light-emitting area that extends beyond the corresponding backlight zone when the backlight zone is illuminated, $t_2$ is the scanning time for each pixel row of the display panel, and $t_3$ is response time when the pixel row receives a row scanning signal. Therefore, turning on the backlight before the complete rotation of liquid crystals can be avoided, thereby preventing the phenomenon of motion blur to some extent.

According to some embodiments of the present disclosure, the time when the last backlight zone is turned off in the row scanning process is $t_4$, satisfying $t_4 \leq (t_6+t_5)-((m/n+a) \times t_2)$, wherein $t_5$ represents the row scanning time required for displaying the entire frame, and $t_6$ represents time of one frame.

According to some embodiments of the present disclosure, the duration for each backlight zone being kept in an on state is $t_7$, satisfying $t_7 \leq t_6 - t_3 - (m/n+2a) \times t_2$.

According to some embodiments of the present disclosure, the time interval between the illumination time of two adjacent backlight zones is the same and is $t_8$, satisfying $t_8 \geq m/n \times t_2$.

According to some embodiments of the present disclosure, $t_8 \leq ((t_6+t_5-t_3)-(m/n+a)\chi t_2 \times 2 - t_7)/(n-1)$.

According to some embodiments of the present disclosure, a portion of a light-emitting area that extends beyond the corresponding backlight zone when the backlight zone is illuminated comprises an area outside the display zone corresponding to the backlight zone with the brightness being greater than or equal to 10% of the maximum brightness of the display zone.

According to some embodiments of the present disclosure, $2 \leq n \leq 24$.

According to some embodiments of the present disclosure, an illumination mode of the backlight zone includes at least one of edge-lit or direct-lit.

According to some embodiments of the present disclosure, a refresh rate of the display device is no less than 60 Hz.

BRIEF DESCRIPTION OF THE DRAWINGS

The foregoing and/or additional aspects and advantages of the present disclosure will become apparent and easy to understand in the description of the embodiments in conjunction with the following accompanying drawings.

REFERENCE NUMERALS

1: display panel; 10: display area; 101': first scanning area; 102': second scanning area; 103': shading area; 101: first display zone; 102: second display zone; 103:

third display zone; 104: fourth display zone; 105: fifth display zone; 106: sixth display zone; 11: shading area; 2: display drive chip; A: first area; B: second area; H: third area; 3: light source; C: first light-emitting area; D: second light-emitting area; E: third light-emitting area; F: area correspondingly displayed after backlight is illuminated; and G: halo extending beyond a corresponding display zone after backlight is illuminated.

DETAILED DESCRIPTION OF EMBODIMENTS

The embodiments of the present disclosure are described in detail below. The embodiments described below are exemplary and are only used to explain the present disclosure and are not to be construed as limiting the present disclosure. Embodiments in which specific techniques or conditions are not specified are implemented according to the techniques or conditions described in the literatures in the art or the product specifications. Reagents or instruments used without indicating a manufacturer are conventional products that are commercially available.

Figure 1:
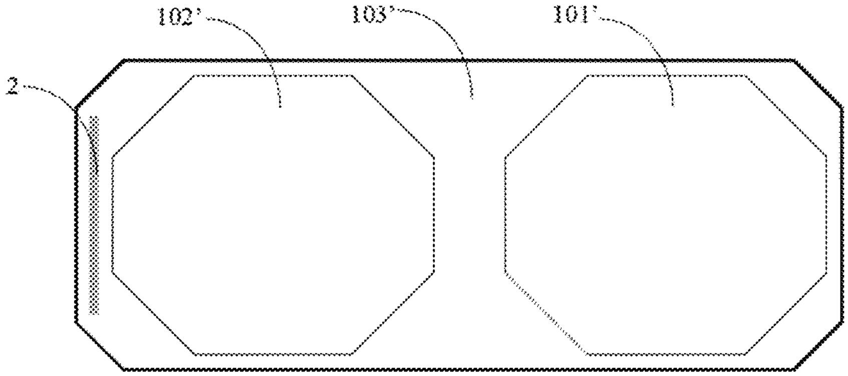
FIG. 1 shows a structural schematic diagram of a display device in the related art.
Figure 2:
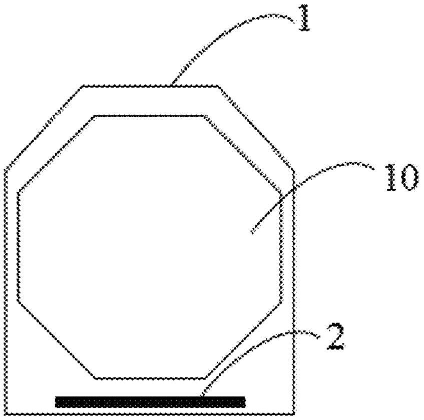
FIG. 2 shows a structural schematic diagram of a display device according to an embodiment of the present disclosure.
Figure 3:
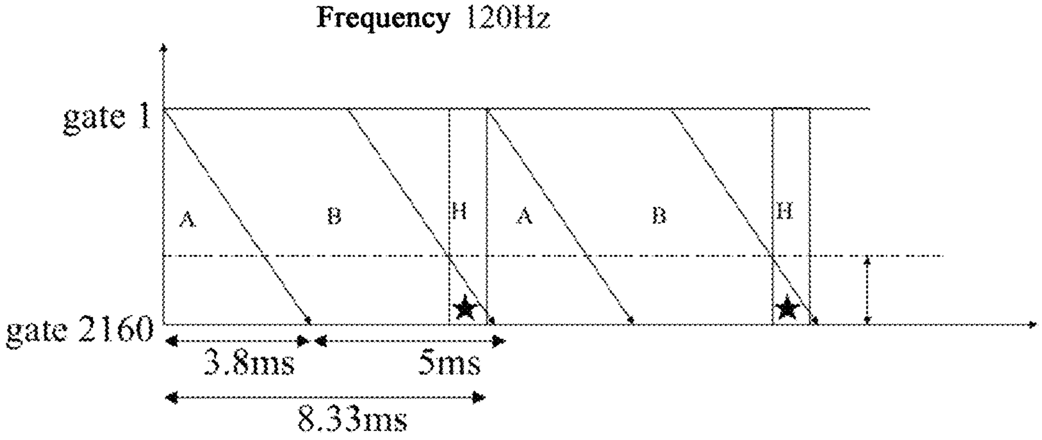
FIG. 3 shows a timing diagram of a display device in the related art.

When a display device in the related art is a binocular single screen, referring to FIG. 1, the two eyes view through a first scanning area 101' and a second scanning area 102' respectively, and a shading area 103' is located between the two scanning areas. Due to the existence of the shading area 103', a halo generated by the first scanning area 101' will not be seen by the other eye, and a halo generated by the second scanning area 102' will not be seen by the other eye. However, when the display device is a monocular single screen (referring to FIG. 2), the shading area 103' within a display area 10 is micrometer-sized. If the backlight is turned on before the rotation of liquid crystal is completed, the human eye will observe a phenomenon of motion blur. Specifically, referring to a timing diagram in FIG. 3, in FIG. 3, a horizontal axis represents time, and a vertical axis represents the number of rows scanned by a display drive chip. In the figure, a first area A represents total time taken by the display drive chip 2 to scan from row 1 to rom 2160, which is 3.8 ms. A second area B represents the longest response time for liquid crystals to rotate from one gray scale to another gray scale, which is 5 ms. A third area H represents backlight illumination time. When a refresh rate is 120 Hz, with the time for one frame being 1/120 Hz, which means that one frame takes 8.33 ms. Since the time for one frame is less than a sum of the time for the display driver chip 2 to complete all row scans and the longest time for liquid crystal rotation (8.33 ms<8.8 ms), the backlight is turned on before the liquid crystals rotate to a correct gray scale during scanning an area of rows at a tail end of the display area (there is an overlap between the third area H and the second area B, indicated by the asterisk). As a result, the human eyes may observe two images: a transitional gray scale when the backlight is on and a correct gray scale of a final state, commonly known as a phenomenon of motion blur.

Figure 4:
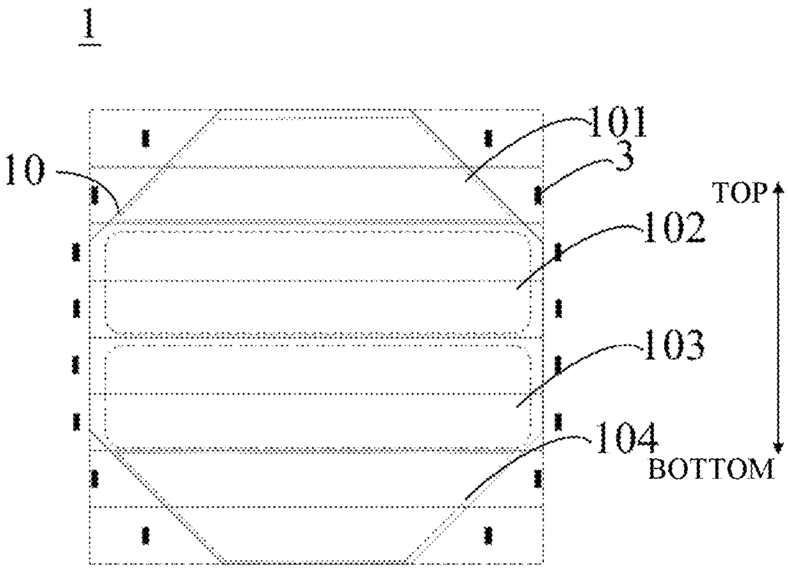
FIG. 4 shows a schematic diagram of a backlight zone of a display device according to another embodiment of the present disclosure.
Figure 5:
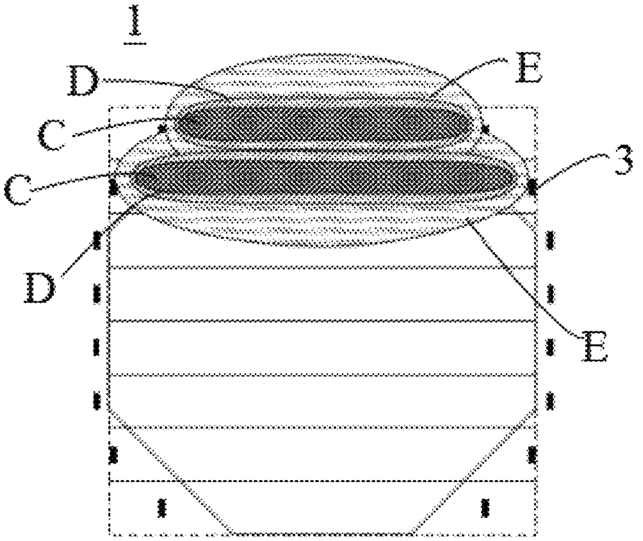
FIG. 5 shows a schematic diagram of backlight illumination of a first display zone in FIG. 4.
Figure 6:
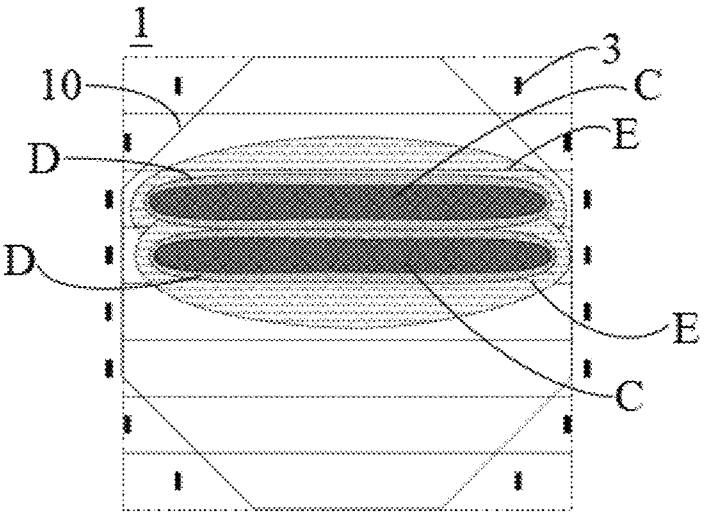
FIG. 6 shows a schematic diagram of backlight illumination of a second display zone in FIG. 4.
Figure 7:
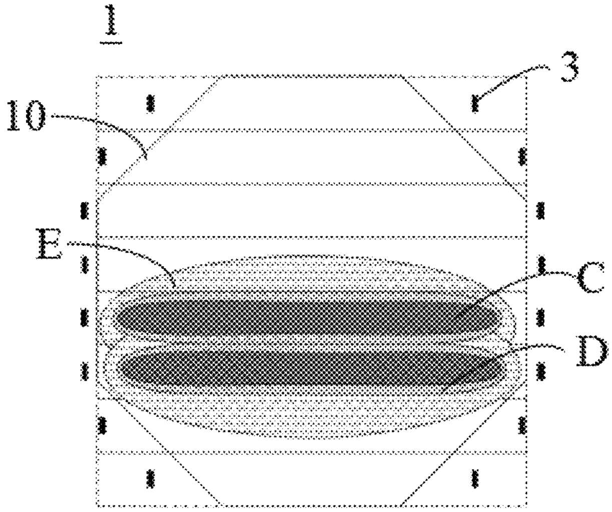
FIG. 7 shows a schematic diagram of backlight illumination of a third display zone in FIG. 4.
Figure 8:
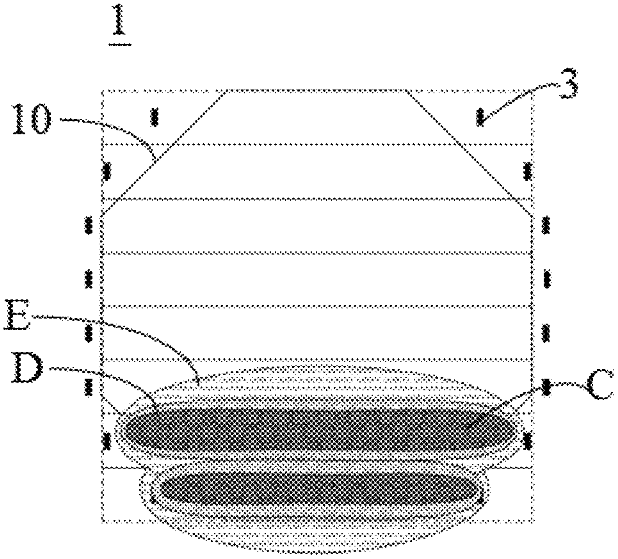
FIG. 8 shows a schematic diagram of backlight illumination of a fourth display zone in FIG. 4.

In one aspect of the present disclosure, a control method for a display device is provided. The display device includes a display panel and a backlight device. The display panel includes a plurality of display zones. Each display zone includes a plurality of pixel rows. The backlight device includes a plurality of backlight zones that emit light independently, and are in one-to-one correspondence with the display zones. The display panel is driven in a row-by-row scanning manner, and the plurality of backlight zones are sequentially illuminated in a process of row scanning of each frame of the display panel. The illumination time when the first backlight zone is illuminated satisfies the following condition: $t_1 \geq (m/n+a) \times t_2 + t_3$, where $t_1$ is the time from the start of displaying each frame of image to the illumination of the first backlight zone, m is the number of the pixel rows, n is the number of the backlight zones, a is the number of the pixel rows occupied by a portion of a light-emitting area that extends beyond the corresponding backlight zone when the backlight zone is illuminated, $t_2$ is the scanning time for each pixel row of the display panel, and $t_3$ is response time when the pixel row receives a row scanning signal. Specifically, the display device includes: a display panel 1, where a display area 10 of the display panel 1 includes a plurality of display zones arranged in a scanning direction, and each display zone includes a plurality of pixel rows; a backlight device including a plurality of backlight zones that are in one-to-one correspondence with the display zones, where each backlight zone, when turned on, forms a halo that extends beyond the display zone corresponding to the backlight zone; a liquid crystal layer arranged between the backlight device and the display panel 1; a backlight controller that controls a light source within the backlight zones to independently emit light; and a display drive chip 2 suitable for performing row scanning within the display area 10 and charging display pixels via a data line. In the row scanning process, liquid crystals in the liquid crystal layer deflect row by row due to a pixel electric field. For example, referring to FIG. 4, when n is 4, the entire display area 10 is divided into a first display zone 101, a second display zone 102, a third display zone 103, and a fourth display zone 104 from top to bottom. Referring to FIG. 5 to FIG. 8, when the display drive chip 2 performs row-by-row scanning from top to bottom, backlights corresponding to the display zones distributed from top to bottom are turned on in sequence. Therefore, turning on the backlight before the liquid crystals rotate to the correct gray scale can be avoided, thereby preventing the phenomenon of motion blur to some extent.

The principle of achieving the above beneficial effects in the present disclosure is described in detail below.

Figure 9:
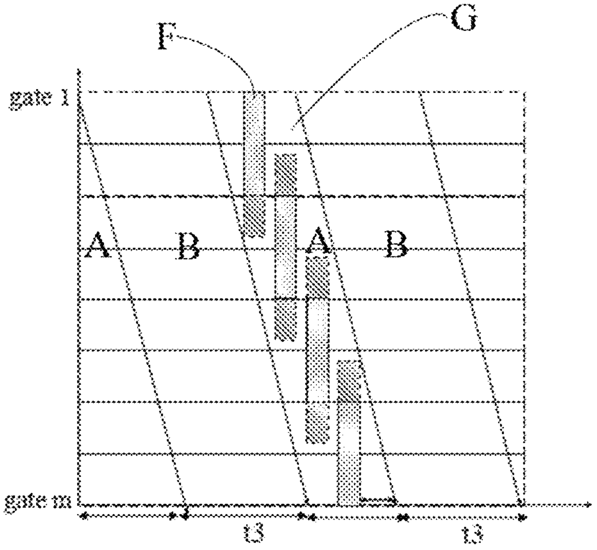
FIG. 9 shows a timing diagram of the display device in FIG. 4.
Figure 10:
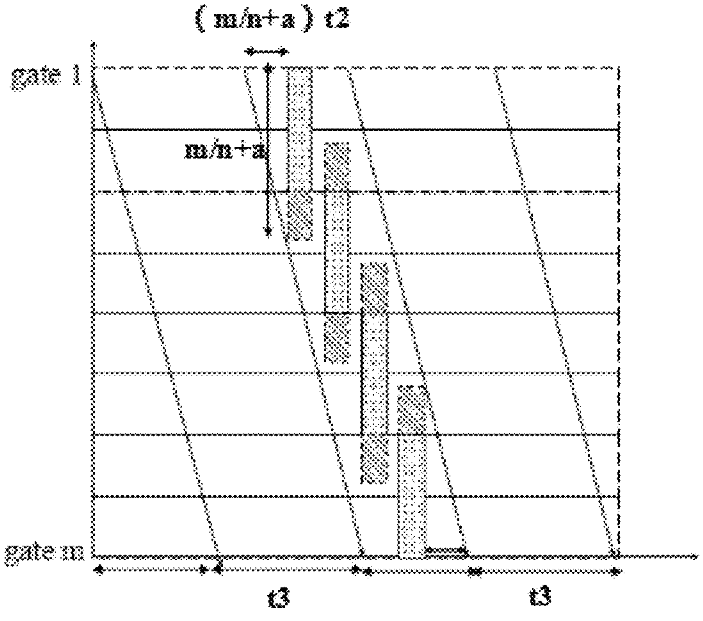
FIG. 10 shows a timing diagram of the display device in FIG. 4.

Referring to the timing diagrams as shown in FIG. 9 and FIG. 10, a horizontal axis represents time, a vertical axis represents the number of rows scanned by the display drive chip 2, and the backlights are turned on sequentially in the scanning process performed by the display drive chip 2 from top to bottom. A halo G that extends beyond the first display zone above a backlight illumination area within the first display zone 101 and a halo G that extends beyond the fourth display zone below a backlight illumination area within the fourth display zone 104 extend beyond the display area 10 and are obscured by a shading area outside the display area 10 and are thus not visible to the human eyes. Halos G that extend beyond the second display zone 102 are formed above and below a backlight illumination area within the second display zone 102. Halos G that extend beyond the third display zone 103 are formed above and below a backlight illumination area within the third display zone 103. Referring to the timing diagram in FIG. 10, in the figure, m/n represents the number of scanned rows in the display zone corresponding to the backlight zone, m/n+a represents the number of scanned rows occupied by the halo G in the first display zone 101 and the halo G that extends beyond the first display zone 101 below the first displayed zone 101 (since the halo G above the first display zone 101 is not within the display area, there is no need for calculation) when the display drive chip 2 performs scanning from top to bottom and the backlight in the first display zone 101 is turned on. According to $(m/n+a) \times t_2$, the waiting time required for the illumination of the backlight zone corresponding to the first display zone 101 may be obtained. According to $(m/n+a)\times t_2+t_3$, the earliest time when the backlight in the first display zone 101 may be turned on relative to the first display row may be obtained. The backlight controller controls the earliest time when the backlight in the first display zone 101 may be turned on, thereby preventing $t_1$ from falling within the response time of the liquid crystals (i.e., preventing $t_1$ from falling within the range of $t_3$). Therefore, turning on the backlight before the complete rotation of the liquid crystals may be avoided, thereby preventing the phenomenon of motion blur to some extent.

Figure 11:
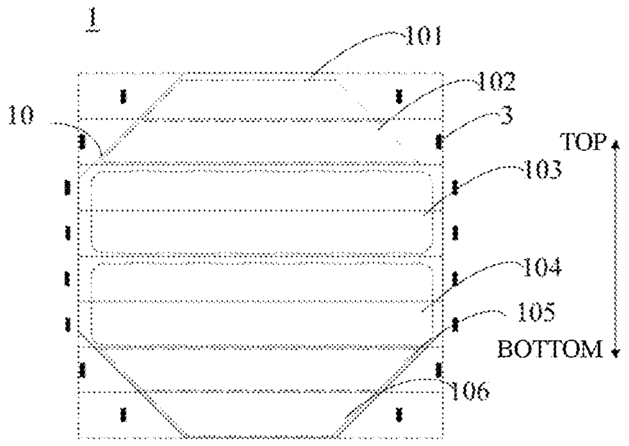
FIG. 11 shows a schematic diagram of a backlight zone of a display device according to another embodiment of the present application.
Figure 12:
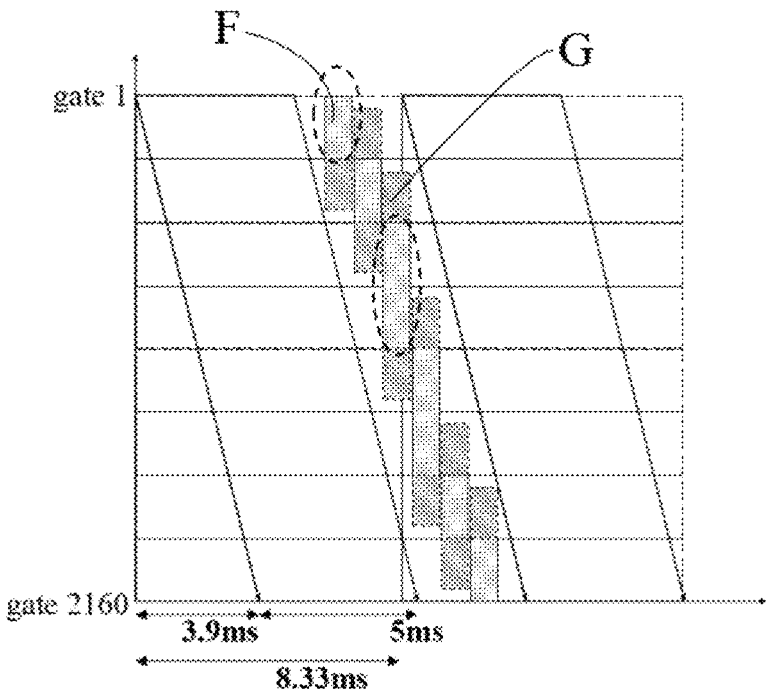
FIG. 12 shows a timing diagram of the display device in FIG. 11.

According to some embodiments of the present disclosure, the number of display zones is not particularly limited, and those skilled in the art may perform design based on specific purposes of the display device. For example, n may satisfy the condition $2\leq n\leq 24$. Specifically, n may be any integer between 2 and 24. If there are too many backlight zones, when a multiplexer is used, the backlight controller controls the backlight illumination time for each backlight zone to be shortened, resulting in a decrease in brightness, or requiring an increase in instantaneous backlight voltage or current, which may affect a display effect and standby time of the display device to some extent. Further, referring to FIG. 11 and FIG. 12, the number of scanned rows corresponding to each backlight zone may vary. When n is 6, display scanned rows in the first display zone 101, the second display zone 102, a fifth display zone 105, and a sixth display zone 106 are the same, and display scanned rows in the third display zone 103 and the fourth display zone 104 are the same but are twice as many as those in the first display zone 101.

According to some embodiments of the present disclosure, a portion of a light-emitting area that extends beyond the corresponding backlight zone when the backlight zone is illuminated refers to an area outside the display zone corresponding to the backlight zone where the brightness is greater than or equal to 10% of the maximum brightness of the display zone. Specifically, in the present disclosure, referring to FIG. 5 to FIG. 8, a first light-emitting area C is an area where the brightness is greater than 80% of the maximum brightness of the backlight zone. A second light-emitting area D is an area where the brightness is greater than 50% but less than 80% of the maximum brightness of the backlight zone. A third light-emitting area E is the halo G, and the halo G refers to the light-emitting area that extends beyond the display zone corresponding to the backlight zone with the brightness greater than or equal to 10% of the maximum brightness when the backlight zone is illuminated.

According to some embodiments of the present disclosure, an illumination mode of the backlight zone is not particularly limited, such as, including at least one of edge-lit or direct-lit. Specifically, edge-lit may indicate that LEDs are located on a side edge of a display screen, and direct-lit may indicate that a light source is located below the display screen, utilizing an array for localized dimming.

According to some embodiments of the present disclosure, the refresh rate of the display device may be no less than 60 Hz.

Figure 13:
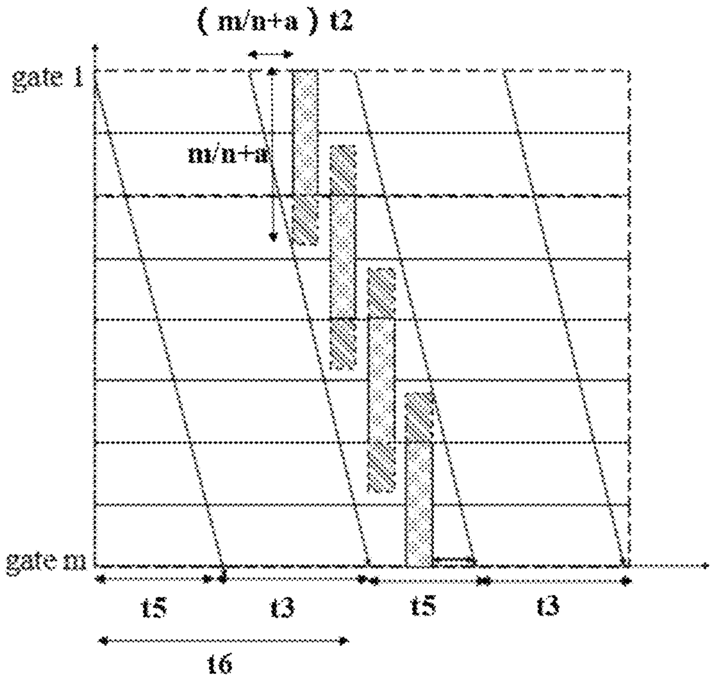
FIG. 13 shows a timing diagram of the display device in FIG. 4.

According to some embodiments of the present disclosure, referring to FIG. 13, to ensure that the backlight of the current frame at a corresponding position is turned off when the liquid crystals start to rotate after row scanning of the corresponding display zone for the next frame is completed, and the time when the last backlight zone is turned off in the row scanning process is $t_4$, satisfying $t_4\leq(t_6+t_5)-((m/n+a)\times t_2)$, where $t_5$ represents the row scanning time required for displaying the entire frame, and $t_6$ represents time of one frame. In other words, $t_1\geq(m/n+a)\times t_2+t_3$ and $t_4\leq(t_6+t_5)-((m/n+a)\times t_2)$ are simultaneously satisfied in the operation process of the display device. For example, when the frequency is 120 Hz, t6 is 8.33 ms, and t5 may be 3.8 ms. Therefore, it is possible to avoid the situation that the backlight of the current frame at the corresponding position is not turned off when the liquid crystals start to rotate after row scanning of the corresponding display zone for the next frame is completed. Therefore, the corresponding backlight zone is turned on after the liquid crystals corresponding to the display zone for the current frame are rotated; and the backlight zone corresponding to the display zone for the current frame is turned off before the liquid crystals corresponding to the display zone for the next frame start to rotate, thereby preventing the human eyes from observing the phenomenon of motion blur.

According to some embodiments of the present disclosure, referring to FIG. 13, when n is 4, there is only one halo G in the first display zone 101 and the fourth display zone 104, and the second display zone 102 and the third display zone 103 both include two halos G. To calculate a maximum duration for which the backlight is kept in an on state, it is necessary to consider the two halos G on an upper side and a lower side of a backlight illuminated area, thereby avoiding the halos G from entering a second area B of the current frame or a second area B of the next frame. Specifically, the duration for each backlight zone is kept in an on state is $t_7$, satisfying $t_7\leq t_6-t_3-(m/n+2a)\times t_2$. In other words, in an operation process of the display device, $t_1\geq(m/n+a)\times t_2+t_3$, $t_4\leq(t_6+t_5)-((m/n+a)\times t_2)$, and $t_7\leq t_6-t_3-(m/n+2a)\times t_2$ are simultaneously met. Therefore, the phenomenon of motion blur can be avoided when the backlight of the first backlight zone is just turned on and the last backlight zone is about to be turned off.

Figure 14:
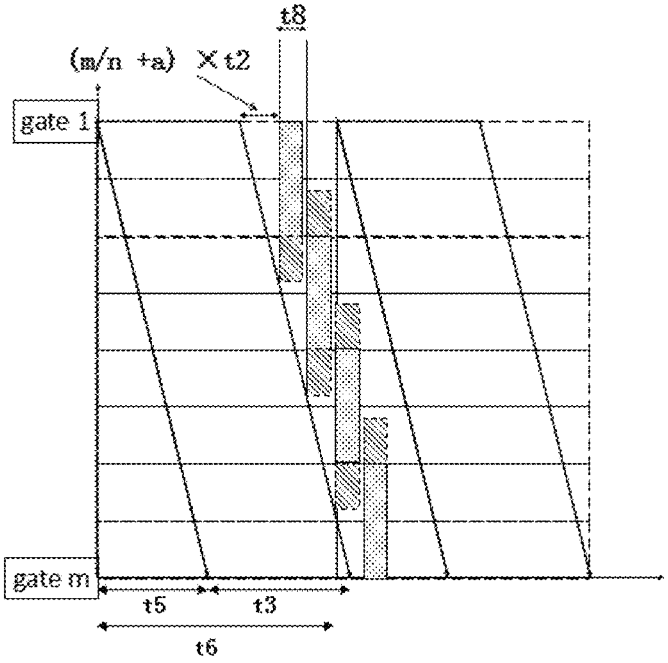
FIG. 14 shows a timing diagram of the display device in FIG. 4.

According to some embodiments of the present disclosure, the time interval between the illumination time of two adjacent backlight zones is the same and is $t_8$, satisfying $t_8\geq m/n\times t_2$. In other words, in the operation process of the display device, $t_1\geq(m/n+a)\times t_2+t_3$, $t_4\leq(t_6+t_5)-((m/n+a)\times t_2)$, $t_7\leq t_6-t_3-(m/n+2a)\times t_2$, and $t_8\geq m/n\times t_2$ are simultaneously met. For example, referring to FIG. 14, when n is 4, there are totally four display zones in the display device, including four corresponding backlight zones that are turned on. There is an interval between the start time of the backlight zones of the two adjacent display zones. Taking the first display zone 101 and the second display zone 102 as an example for description, the time when the first backlight zone is turned on and the time when the fourth backlight zone is turned off are shown in FIG. 14. The interval time between the start time of the first backlight zone and the start time of the second backlight zone is the shortest. If the interval between the start time of the first backlight zone and the start time of the second backlight zone continues to decrease, the halo G generated when the second backlight zone is turned on will appear earlier than the time (maximum response time) when ensuring completed rotation of the liquid crystals of the next display zone (the third display zone 103). In this case, turning on the backlight zone may result in an observation of the phenomenon of motion blur. Therefore, the phenomenon of motion blur of the liquid crystals can be further avoided by satisfying $t_8\geq m/n\times t_2$.

Figure 15:
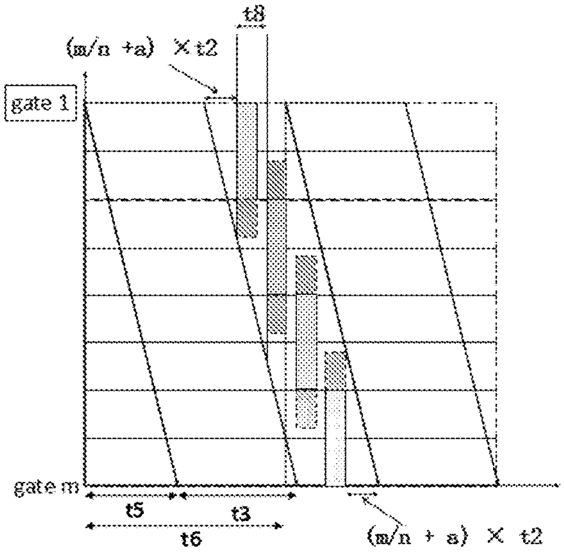
FIG. 15 shows a timing diagram of the display device in FIG. 4.

According to some embodiments of the present disclosure, $t_8\leq((t_6+t_5-t_3)-(m/n+a)\times t_2\times 2-t_7)/(n-1)$. In other words, in the operation process of the display device, $t_1\geq(m/n+a)\times t_2+t_3$, $t_4\leq(t_6+t_5)-((m/n+a)\times t_2)$, $t_7\leq t_6-t_3-(m/n+2a)\times t_2$, $t_8\geq m/$ $n \times t_2$, and $t_8 \leq ((t_6+t_5-t_3)-(m/n+a) \times t_2 \times 2-t_7)/(n-1)$ may be simultaneously satisfied. For example, referring to FIG. 15, when n is 4, there are totally 4 display zones in the display device, including four corresponding backlight zones that are turned on. The time when the first backlight zone is turned on and the time when the fourth backlight zone is turned off are shown in FIG. 15. In this case, the interval time between the start time of the first backlight zone and the start time of the second backlight zone is the longest. If the interval time continues to increase, the halo G of the last backlight zone may be affected, which may enter the second area B of the next frame, causing a risk of motion blur of the liquid crystals.

In the description of the present disclosure, it should be understood that the orientation or position relationship indicated by the terms "center", "longitudinal", "transverse", "length", "width", "thickness", "upper", "lower", "front", "back", "left", "right", "vertical", "horizontal", "top", "bottom", "inner", "outer", "clockwise", "anticlockwise", "axial direction", "radial direction", "circumferential direction", etc. are based on the orientation or position relationship shown in the accompanying drawings and are intended to facilitate the description of the present disclosure and simplify the description only, rather than indicate or imply that an apparatus or component referred to must have a particular orientation or be constructed and operated in a particular orientation, and therefore are not to be understood as limitations on the present disclosure.

In addition, the terms "first" and "second" are used for descriptive purposes only, and cannot be construed as indicating or implying relative importance or implicitly indicating the number of the indicated technical features. Therefore, features limited with "first" and "second" may explicitly or implicitly include one or more of the features. In the description of the present disclosure, "a plurality of" means two or more, unless otherwise explicitly and specifically defined.

In the present disclosure, unless otherwise expressly specified and limited, a first feature being "above" or "below" a second feature may be a direct contact between the first feature and the second feature, or an indirect contact between the first feature and the second feature through an intermediate medium. In addition, the first feature being "over", "above", and "on" the second feature may be the first feature being over or above the second feature, or merely means that the horizontal height of the first feature is higher than that of the second feature. The first feature being "under", "below", and "underneath" the second feature may be the first feature being under or below the second feature, or merely means that the horizontal height of the first feature is less than that of the second feature.

In the description of the specification, descriptions of reference terms "one embodiment", "some embodiments", "example", "specific example", "some examples", or the like imply that specific features, structures, materials, or characteristics described in conjunction with the embodiment or the example are included in at least one embodiment or example of the present disclosure. In the specification, schematic representations for the above terms are not necessarily specific to the same embodiment or example. Moreover, the described specific features, structures, materials, or characteristics may be suitably combined in any one or more embodiments or examples. In addition, in the case of no mutual contradiction, those skilled in the art may combine different embodiments or examples described in the specification, as well as features of different embodiments or examples.

Although the embodiments of the present disclosure have been shown and described above, it should be understood that the above embodiments are exemplary and are not to be construed as limiting the present disclosure. Those of ordinary skill in the art may make changes, modifications, alterations, and variations to the above embodiments within the scope of the present disclosure.

We claim:

1. A control method for a display device, wherein the display device comprises a display panel and a backlight device, the display panel comprises a plurality of display zones, each display zone comprises a plurality of pixel rows, and the backlight device comprises a plurality of backlight zones that emit light independently, and the backlight zones are in one-to-one correspondence with the display zones;

wherein the display panel is driven in a row-by-row scanning manner, and the plurality of backlight zones are sequentially illuminated in a process of row scanning of each frame of the display panel; and the illumination time when the first backlight zone is illuminated satisfies the following condition:

$t_1 \geq (m/n+a) \times t_2+t_3$, wherein $t_1$ is the time from the start of displaying each frame of image to the illumination of the first backlight zone, m is the number of the pixel rows, n is the number of the backlight zones, a is the number of pixel rows occupied by a portion of a light-emitting area that extends beyond a corresponding backlight zone when the backlight zone is illuminated, $t_2$ is the scanning time for each pixel row of the display panel, and $t_3$ is response time when the pixel row receives a row scanning signal.

2. The method according to claim 1, wherein the time when the last backlight zone is turned off in the row scanning process is $t_4$, satisfying $t_4 \leq (t_6+t_5)-((m/n+a) \times t_2)$, wherein $t_5$ represents the row scanning time required for displaying the entire frame, and $t_6$ represents time of one frame.

3. The method according to claim 2, wherein the duration for each backlight zone is kept in an on state is $t_7$, satisfying $t_7 \leq t_6-t_3-(m/n+2a) \times t_2$.

4. The method according to claim 3, wherein the time interval between the illumination time of two adjacent backlight zones is the same and is $t_8$, satisfying $t_8 \geq m/n \times t_2$.

5. The method according to claim 4, wherein $t_8 \leq ((t_6+t_5-t_3)-(m/n+a) \times t_2 \times 2-t_7)/(n-1)$.

6. The method according to claim 1, wherein a portion of a light-emitting area that extends beyond the corresponding backlight zone when the backlight zone is illuminated comprises an area outside the display zone corresponding to the backlight zone with the brightness being greater than or equal to 10% of the maximum brightness of the display zone.

7. The method according to claim 1, wherein $2 \leq n \leq 24$.

8. The method according to claim 1, wherein an illumination mode of the backlight zone comprises at least one of edge-lit or direct-lit.

9. The method according to claim 1, wherein a refresh rate of the display device is no less than 60 Hz.

10. A display device, comprises:

a display panel, comprising a plurality of display zones, wherein each display zone comprises a plurality of pixel rows; and a backlight device, comprising a plurality of backlight zones that emit light independently, and the backlight zones are in one-to-one correspondence with the display zones;

wherein the display panel is driven in a row-by-row scanning manner, and the plurality of backlight zones are sequentially illuminated in a process of row scanning of each frame of the display panel; and the illumination time when the first backlight zone is illuminated satisfies the following condition:

$t_1 \geq (m/n+a) \times t_2 + t_3$, wherein $t_1$ is the time from the start of displaying each frame of image to the illumination of the first backlight zone, m is the number of the pixel rows, n is the number of the backlight zones, a is the number of pixel rows occupied by a portion of a light-emitting area that extends beyond a corresponding backlight zone when the backlight zone is illuminated, $t_2$ is the scanning time for each pixel row of the display panel, and $t_3$ is response time when the pixel row receives a row scanning signal.

11. The display device according to claim 10, wherein the time when the last backlight zone is turned off in the row scanning process is $t_4$, satisfying $t_4 \leq (t_6+t_5)-((m/n+a) \times t_2)$, wherein $t_5$ represents the row scanning time required for displaying the entire frame, and $t_6$ represents time of one frame.

12. The display device according to claim 11, wherein the duration for each backlight zone is kept in an on state is $t_7$, satisfying $t_7 \leq t_6 - t_3 - (m/n+2a) \times t_2$.

13. The display device according to claim 12, wherein the time interval between the illumination time of two adjacent backlight zones is the same and is $t_8$, satisfying $t_8 \geq m/n \times t_2$.

14. The display device according to claim 13, wherein $t_8 \leq ((t_6+t_5-t_3)-(m/n+a) \times t_2 \times 2 - t_7)/(n-1)$.

15. The display device according to claim 10, wherein a portion of a light-emitting area that extends beyond the corresponding backlight zone when the backlight zone is illuminated comprises an area outside the display zone corresponding to the backlight zone with the brightness being greater than or equal to 10% of the maximum brightness of the display zone.

16. The display device according to claim 10, wherein $2 \leq n \leq 24$.

17. The display device according to claim 10, wherein an illumination mode of the backlight zone comprises at least one of edge-lit or direct-lit.

18. The display device according to claim 10, wherein a refresh rate of the display device is no less than 60 Hz.

19. An apparatus, comprising:

a display device, comprises:

a display panel, comprising a plurality of display zones, wherein each display zone comprises a plurality of pixel rows; and a backlight device, comprising a plurality of backlight zones that emit light independently, and the backlight zones are in one-to-one correspondence with the display zones;

wherein the display panel is driven in a row-by-row scanning manner, and the plurality of backlight zones are sequentially illuminated in a process of row scanning of each frame of the display panel; and the illumination time when the first backlight zone is illuminated satisfies the following condition:

$t_1 \geq (m/n+a) \times t_2 + t_3$, wherein $t_1$ is the time from the start of displaying each frame of image to the illumination of the first backlight zone, m is the number of the pixel rows, n is the number of the backlight zones, a is the number of pixel rows occupied by a portion of a light-emitting area that extends beyond a corresponding backlight zone when the backlight zone is illuminated, $t_2$ is the scanning time for each pixel row of the display panel, and $t_3$ is response time when the pixel row receives a row scanning signal.

20. The apparatus according to claim 19, wherein the time when the last backlight zone is turned off in the row scanning process is $t_4$, satisfying $t_4 \leq (t_6+t_5)-((m/n+a) \times t_2)$, wherein $t_5$ represents the row scanning time required for displaying the entire frame, and $t_6$ represents time of one frame.

* * * * *